United States Patent [19]

Nihira et al.

[11] Patent Number: 5,750,045
[45] Date of Patent: May 12, 1998

[54] PREPARATION OF FERRITE MATERIALS

[75] Inventors: Yoshito Nihira; Takeshi Nomura; Masahiro Onizuka, all of Chiba, Japan

[73] Assignee: TDK Corporation, Tokyo, Japan

[21] Appl. No.: 499,293

[22] Filed: Jul. 6, 1995

[30] Foreign Application Priority Data

Jul. 8, 1994 [JP] Japan .................................. 6-180746

[51] Int. Cl.$^6$ .................................................. C01B 49/00
[52] U.S. Cl. ........................ 252/62.56; 252/62.62; 252/62.63; 252/62.64; 423/594; 423/632
[58] Field of Search ................... 423/151, 488, 423/594, 632; 252/62.56, 62.62, 62.63, 62.64

[56] References Cited

U.S. PATENT DOCUMENTS 5,589,097 12/1996 Nihira et al. ..................... 252/62.59

FOREIGN PATENT DOCUMENTS

| 49-35520 | 9/1974 | Japan . |
| 58-135132 | 8/1983 | Japan . |
| 61-72630 | 4/1986 | Japan . |

OTHER PUBLICATIONS

Current Advances in Materials and Processes, vol. 6, No. 5–1586, 1993, Tetsurou Tamatani, "Formation of Zinc-Manganese Ferrites from Chloride and Oxide Mixtures", 7 pages.

*Primary Examiner*—Melissa Bonner
*Attorney, Agent, or Firm*—Oblon, Spivak, McClelland, Maier & Neustadt, P.C.

[57] ABSTRACT

Ferrite materials including spinel and magnetoplumbite ferrite materials are prepared by using a mixture containing at least one metal chloride and at least one metal oxide as a starting raw material and roasting the mixture in a steam-containing atmosphere to carry out pyrolysis reaction and solid phase reaction at the same time.

17 Claims, 1 Drawing Sheet

1

PREPARATION OF FERRITE MATERIALS

BACKGROUND OF THE INVENTION

1. Field of the Invention

This invention relates to a method for preparing ferrite materials, especially spinel and magnetoplumbite ferrite materials.

2. Prior Art

Ferrite materials commonly used in the art include spinel and magnetoplumbite ferrite materials.

Known spinel ferrite materials include magnetite, Zn system ferrite, Mn-Zn system ferrite, Ni-Cu-Zn system ferrite, Ni-Zn system ferrite, Mg-Mn system ferrite, Mg-Zn system ferrite, and Mg-Mn-Zn system ferrite materials and are often used as electrophotographic toner carriers and magnetic cores. Known magnetoplumbite ferrite materials include M, Y, Z and W types and are mainly used as permanent magnet materials and electromagnetic wave-absorbing materials.

Prior art industrial methods for preparing spinel ferrite materials, for example, magnetite magnetic powder include a wet process and a solid phase process. The wet method for preparing magnetite magnetic powder is by adding an alkali to a ferrous chloride solution to form ferrous hydroxide and passing an oxidizing gas into the alkaline solution to oxidize the ferrous hydroxide therein, thereby producing magnetite (see JP-B 35520/1974). The method for preparing magnetite according to a solid phase process is by subjecting hematite to a reducing heat treatment with a reducing gas such as hydrogen, thereby producing magnetite (see JP-A 72630/1986). These methods are said to have the advantage that pure spinel single phase magnetite can be produced because the oxidizing or reducing atmosphere can be controlled. However, these methods have the drawback that the manufacture cost is increased because of many steps involved therein.

Meanwhile, for utilizing iron chloride in spent pickling solution resulting from hydrochloric acid pickling of strip steel in the steel making industry, it is a common practice to produce iron oxide by roasting or pyrolyzing the iron chloride in air. The roasting or pyrolyzing technique generally includes an atomizing roaster technique of atomizing a waste hydrochloric acid pickling solution from the roaster top, effecting pyrolysis in the roaster, and collecting iron oxide from the roaster bottom and a fluidized bed roaster technique of atomizing a waste hydrochloric acid solution into a fluidized bed held at a certain temperature where pyrolysis is effected and collecting iron oxide from the roaster top.

The roasting techniques have the advantages that precipitating, grinding and other steps can be omitted and the manufacture cost of iron oxide can be lowered because a spent pickling solution of iron chloride is utilized. However, since a substantial portion of iron chloride is oxidized in air so that the major phase consists of hematite, it is difficult to synthesize magnetite powder by the existing roasting techniques.

In order to produce satisfactory magnetite magnetic powder in a simple manner, we previously made the following two proposals in Nihira, Zhuang and Nomura, U.S. Ser. No. 08/362,865 filed Dec. 23, 1994 for "Method for Preparing Magnetite Magnetic Powder", assigned to the same assignee as the present invention, now U.S. Pat. No. 5,589,097.

According to a first method, a magnetite magnetic powder is prepared by using ferrous chloride as a starting material,
and heat treating the material in a steam-containing atmosphere. The resulting magnetite magnetic powder has a magnetite phase content of at least 90% by weight and a saturation magnetization as of 82 to 92 emu/g. The heat treatment is effected within the range defined and encompassed by a tetragon having four points A, B, C and D given by the inlet steam pressure of the atmosphere and heat treating temperature as A: 1000° C., 0.1013 MPa (760 mmHg), B: 500° C., 0.1013 MPa, C: 750° C., 0.0312 MPa (200 mmHg), and D: 530° C., 0.0312 MPa in a graph having an inlet steam pressure (MPa) of the atmosphere on the ordinate and a temperature (° C.) on the abscissa. Steam is introduced and filled in the heat treating furnace prior to heating and continuously introduced and flowed through the furnace during heat treatment. The steam pressure is adjusted by controlling the temperature of steam under atmospheric pressure, for example, to a steam pressure of 0.1013 MPa at 100° C., a steam pressure of 0.0845 MPa (600 mmHg) at 95° C., a steam pressure of 0.0578 MPa (400 mmHg) at 85° C., a steam pressure of 0.0312 MPa at 70° C. The inlet steam pressure used herein indicates the pressure of steam when it is introduced into the heat treating furnace.

According to a second method, like the first method, a magnetite magnetic powder is prepared by using ferrous chloride as a starting material, pre-treating the material by heat treating it in a non-oxidizing atmosphere, cooling the pre-treated material to a predetermined temperature in an oxygen-containing atmosphere, and thereafter roasting the cooled material in a steam-containing atmosphere for pyrolysis. The resulting magnetite magnetic powder has a specific surface area of 1.0 to 3.0 m²/g, a saturation magnetization as of 82 to 92 emu/g and a magnetite phase content of at least 90% by weight.

By these two methods, magnetite magnetic powder having satisfactory properties is prepared simply by using ferrous chloride as a starting material.

On the other hand, one prior art industrial method for preparing magnetoplumbite type ferrite materials, for example, barium ferrite is a solid phase process. The solid phase process for preparing barium ferrite mainly involves solid phase reaction between $BaCO_3$ and hematite in air to produce $BaO.6Fe_2O_3$. This process, however, has the drawback of an increased manufacture cost because of many steps involved therein.

SUMMARY OF THE INVENTION

An object of the invention is to provide a method for preparing ferrite materials such as spinel type ferrite materials including magnetite and magnetoplumbite type ferrite materials in a simple manner.

According to a first aspect of the invention, a ferrite material is prepared by mixing one or more metal chlorides including at least iron chloride ($FeCl_2$) and one or more metal oxides including at least iron oxide ($Fe_2O_3$) to form a mixture as a starting raw material, and roasting the raw material. At least a part of the roasting step is carried out in a steam-containing atmosphere so that the raw material may undergo pyrolysis reaction and solid phase reaction at the same time. Preferably the mixture contains the metal chloride and the metal oxide in a molar ratio between 99/1 and 30/70. A spinel ferrite material is prepared from a mixture which contains iron chloride, optionally at least one metal chloride selected from chlorides of divalent metals: Ni, Cu, Co, Zn, Mg and Mn and a chloride of trivalent Fe, iron oxide, and optionally at least one metal oxide selected from oxides of divalent metals: Ni, Cu, Co, Zn, Mg and Mn and an oxide of trivalent Mn.

According to a second aspect of the invention, a ferrite material is prepared by using a mixture containing at least one metal chloride selected from chlorides of divalent metals: Ba, Sr, Fe, Ni, Co, Mg and Zn and a chloride of trivalent Fe and at least one metal oxide selected from oxides of divalent metals: Pb, Ni, Mg, Co and Zn and an oxide of trivalent Fe as a starting raw material. The method includes a first stage of roasting the raw material in an atmosphere consisting of a non-oxidizing gas and steam so that the raw material may undergo pyrolysis reaction and solid phase reaction at the same time, thereby forming a spinel ferrite material and an intermediate product, a second stage of roasting in a non-oxidizing atmosphere, and a third stage of roasting in an oxidizing atmosphere to thereby effect solid phase reaction, thereby producing a magnetoplumbite ferrite material.

ADVANTAGES

Since the method for preparing ferrite materials according to the invention uses a mixture containing at least one metal chloride and at least one metal oxide as a starting raw material, ferrite materials are easily manufactured through a significantly reduced number of steps as compared with prior art methods. For example, magnetite which is one of spinel ferrite materials can be readily prepared by using a mixture of $FeCl_2$ and $Fe_2O_3$ as a starting raw material and roasting the mixture in a steam-containing atmosphere according to the following reaction scheme.

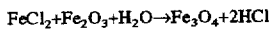

$FeCl_2 + Fe_2O_3 + H_2O \rightarrow Fe_3O_4 + 2HCl$

The method of the invention allows the pyrolysis temperature to be lower as compared with the sole use of ferrous chloride. More particularly, the sole use of ferrous chloride requires the pyrolysis temperature to be set in the range of 550° to 900° C. for conversion into single phase magnetite whereas the present invention allows for production of single phase magnetite even at a pyrolysis temperature of 430° C.

According to the invention, the ferrite material is available in fine particulate form having a very small particle size as demonstrated by a specific surface area of 0.8 to 3 m²/g. This eliminates a pulverizing step and reduces the number of steps. The method of the invention can produce ferrite material at low cost.

Barium ferrite which is one of magnetoplumbite ferrite materials can be readily prepared by using a mixture of $BaCl_2$, $FeCl_2$ and $Fe_2O_3$ as a starting raw material and roasting the mixture in the following three stages. In stage (1), pyrolysis and solid phase reaction are first carried out in a mixed atmosphere of a non-oxidizing gas (e.g., $N_2$) and steam.

$BaCl_2 + FeCl_2 + Fe_2O_3 + 2H_2O \rightarrow Fe_3O_4 + BaO$ (intermediate) $+ 4HCl$ In stage (2), the atmosphere is switched to solely a non-oxidizing gas (e.g., $N_2$), the system is kept stable, and the pyrolysis and solid phase reaction temperature is raised. In stage (3), the atmosphere is switched to an oxidizing atmosphere (e.g., air) and solid phase reaction is carried out, obtaining the end product $BaFe_{12}O_{19}$.

$4Fe_3O_4 + BaO$ (intermediate) $+ O_2 \rightarrow BaO \cdot 6Fe_2O_3$

The method of the invention can reduce the manufacturing cost as compared with the prior art because the number of steps is reduced, operation is easy and inexpensive raw materials are used.

BEST MODE FOR CARRYING OUT THE INVENTION

Figure 1:
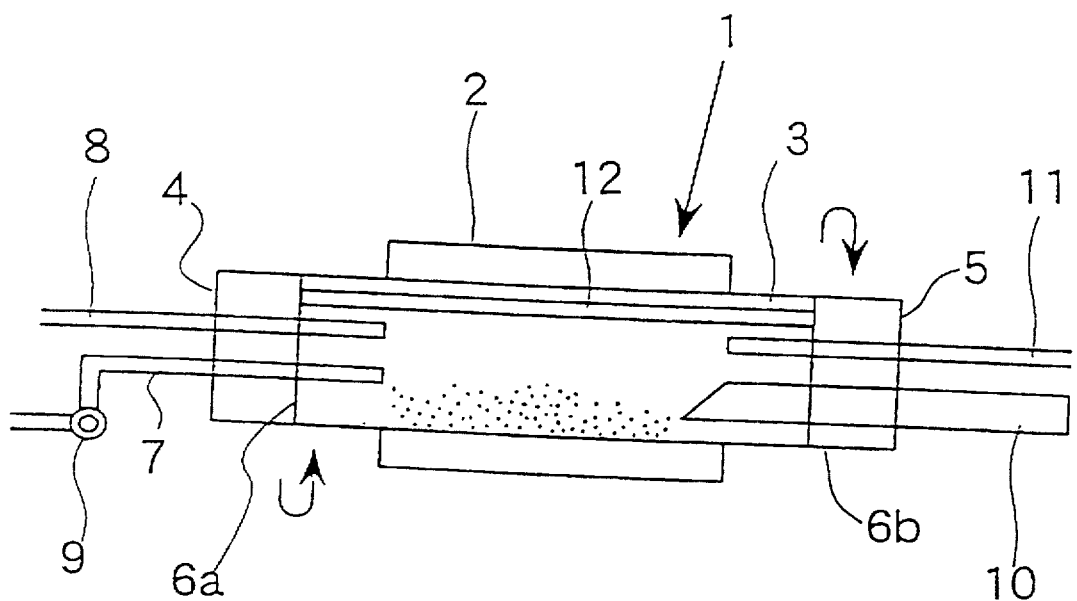
FIG. 1 is a longitudinal cross-sectional view of a rotary kiln used in a method of producing ferrite material according to the invention.

According to the invention, a ferrite material is prepared using a mixture containing at least one metal chloride and at least one metal oxide as a starting raw material. Depending on the type of ferrite material, the mixture may contain a metal carbonate in addition to the metal chloride and metal oxide. Among these raw materials, the metal chloride may be in solid or solution form. Where a solid raw material is used, it should preferably have a mean particle size of about 1 to about 1,000 μm.

The ferrite materials prepared by the present invention include spinel ferrites represented by the general formula: $MO \cdot Fe_2O_3$ wherein M is a divalent metal ion, such as magnetite, Zn system ferrite, Mn-Zn system ferrite, Ni-Cu-Zn system ferrite, Ni-Zn system ferrite, Mg-Mn system ferrite, Mg-Zn system ferrite, Mg-Mn-Zn system ferrite, Cu-Zn system ferrite, Mg-Cu-Zn system ferrite, Mn system ferrite, and Ni system ferrite; and magnetoplumbite ferrites represented by the general formulae: $MFe_{12}O_{19}$, $MMe_2Fe_{16}O_{27}$, $M_2Me_2Fe_{12}O_{22}$, and $M_3Me_2Fe_{24}O_{41}$ wherein M is an alkali metal Ba, Sr or Pb, and Me is an iron series transition metal Fe, Co, Ni, Cu or Zn, for example, M type ferrites such as barium ferrite and strontium ferrite, Y, Z and W type ferrites as represented by $CO_2Y$, $CO_2Z$, $Zn_2Y$, $Mg_2Y$, and $CO_2W$.

The mixture contains the metal chloride and the metal oxide in a molar ratio between 99/1 and 30/70. If the mixture contains more metal chloride outside the range, the temperature at which the end phase creates would be higher. If the mixture contains more metal oxide outside the range, it would be difficult to produce the end phase as a single phase. It is not critical which component is a chloride or oxide, and an increased degree of freedom is afforded for a choice of raw materials. This is a great advantage of the invention.

Preferably the metal chloride is selected from chlorides of divalent metals: Fe, Ni, Cu, Co, Zn, Mg, Mn, Ba, Sr, Pb and Ag and a chloride of a trivalent metal: Fe. Also preferably the metal oxide is selected from oxides of divalent metals: Ni, Cu, Co, Zn, Mg, Mn, Ba, Sr, Pb and Ag and oxides of trivalent metals: Fe and Mn.

More preferably mixtures of $FeCl_2$ and $Fe_2O_3$, mixtures of $FeCl_2$, $Fe_2O_3$, and at least one of the metal chlorides and oxides mentioned above or at least one of carbonates of metals: Ba, Sr, Pb and Co are used as the starting material.

Most preferably, the mixture contains 40 to 95 mol % of $FeCl_2$ plus $Fe_2O_3$ (exclusive of magnetite). Within this range, the resulting ferrite has a primary phase of spinel and a uniform distribution of elements therein. Better results are obtained when the molar ratio of $FeCl_2/Fe_2O_3$ ranges from 0.6 to 18. A molar ratio of less than 0.6 would render it difficult to provide a single phase of spinel whereas a molar ratio of more than 18 would excessively raise the temperature at which a single phase of spinel forms.

Among the above-mentioned raw materials, $FeCl_2$ is desirably ferrous chloride contained in a spent hydrochloric acid pickling solution used in pickling of strip steel in the steel making industry or ferrous chloride obtained by dissolving metallic iron such as iron scraps in hydrochloric acid.

If the metal chloride is available in solid form, respective raw materials are weighed so as to provide a desired molar ratio and mixed in a vibratory mill. If the metal chloride is available in solution form, the metal chloride solution and another raw material(s) are weighed so as to provide a desired molar ratio, dissolved in water, and heated with stirring to evaporate off water, obtaining a mixed material.

On roasting, the mixture undergoes pyrolysis reaction and solid phase reaction at the same time, producing ferrite. More particularly, $FeCl_2$ converts into FeO through pyrolysis reaction and at the same time makes solid phase reaction with $Fe_2O_3$ to form magnetite. Other spinel ferrites are similarly produced. This roasting is preferably carried out in an atmosphere consisting of a non-oxidizing gas and steam at a temperature in the range of 430° to 800° C. Steam in the atmosphere should have an inlet steam pressure (as defined above) of 0.0312 to 0.1013 MPa, with a higher steam pressure being preferred. The non-oxidizing gas used herein is preferably nitrogen gas, argon gas or the like and substantially free of oxygen. Where the mixture contains zinc, in order to prevent evaporation of zinc, preferably an atmosphere containing oxygen and steam is used during heating in a low temperature region from the start to about 350° C. and a switch is then made to an atmosphere containing non-oxidizing gas and steam during subsequent heating in a higher temperature region.

Where roasting is effected in the above-mentioned temperature range, spinel ferrite having satisfactory properties is obtained. Synthesis is insufficient outside the above-mentioned temperature range because there are produced more phases other than the spinel ferrite (for example, wustite and hematite phases if the end product is magnetite).

In the manufacture of magnetoplumbite ferrite, roasting in the above-mentioned temperature range generally results in a mixture of magnetite and unreacted materials or intermediate products, which is further heated to the destined temperature in a non-oxidizing gas whereupon pyrolysis reaction and solid phase reaction proceed in an oxidizing atmosphere. This roasting is preferably carried out at a temperature of 900° to 1,400° C. That is, the atmosphere is a non-oxidizing gas plus steam at the initial, then solely a non-oxidizing gas, and finally switched to an oxidizing gas. The oxidizing atmosphere should preferably contain more than 15% by volume of oxygen.

Roasting may be practiced by any roasting technique as long as the furnace used can be effectively shut off from the ambient. Exemplary are an atomizing roaster technique, fluidized bed roaster technique, rotary kiln technique, and tunnel kiln technique.

The atomizing roaster technique involves adjusting the concentration of iron chloride or the like in an aqueous solution, atomizing the adjusted chloride aqueous solution into a roasting furnace from its top, effecting atomization and roasting such that atomized droplets may flow counter to the high-temperature heating medium gas, and taking out of the furnace bottom an oxide powder resulting from this roasting reaction.

The fluidized bed roaster technique involves adjusting the concentration of iron chloride or the like in an aqueous solution, atomizing the adjusted chloride aqueous solution into a fluidization roasting furnace having a fluidized bed held at a certain temperature, effecting atomization and roasting such that atomized droplets may flow in the same direction as the high-temperature heating medium gas, and taking out of the furnace top an oxide powder resulting from this roasting reaction.

The rotary kiln technique uses a kiln in the form of a large iron cylinder lined with refractory brick resting at an angle on a rotating means. The iron cylinder is heated at the lower end and charged with a raw material from the upper end. As the cylinder rotates, the raw material migrates toward the lower end of the maximum temperature whereby the raw material is fired or roasted.

Figure 2:
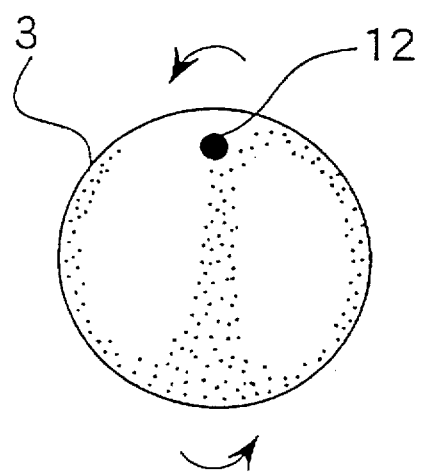
FIG. 2 is a transverse cross-sectional view of the rotary kiln.

One exemplary rotary kiln used herein is one of the structure shown in FIGS. 1 and 2.

A rotary kiln 1 includes a rotary furnace main body 2. The main body 2 has a cylindrical core tube 3 where a raw material is admitted into the core tube 3 from one end 4 and subject to heat treatment. Ferrite material produced therein is removed from another end 5. The furnace core tube 3 is tilted at an angle of 10 to 30 degrees relative to the horizon with the one end 4 where the raw material is admitted being located above and the other end 5 where ferrite material is removed being located below. Therefore, this rotary kiln 1 has a fluidizing angle in the range of 10 to 30 degrees. It is also desirable to set the revolution of the furnace core tube 3 in the range of 3 to 30 rpm.

The furnace core tube 3 at the one and other ends is equipped with plugs 6a and 6b for sealing the furnace core tube interior. The plug 6a at the one end 4 is provided with a raw material inlet pipe 7 for admitting a raw material into the furnace core tube 3 and a HCl recovery pipe 8 for recovering HCl released upon magnetite formation. A metering pump 9 is disposed midway the raw material inlet pipe 7 for pumping a certain quantity of a (liquid) raw material into the furnace core tube 3.

The plug 6b at the other end 5 is provided with a recovery pipe 10 for taking the ferrite material produced within the furnace out of the furnace and a gas admitting pipe 11 for introducing a surrounding gas into the furnace. Disposed within the furnace core tube 3 is a stripping bar 12 of glass which is fixedly secured so as not to move with the furnace core tube 3 as best shown in FIG. 2. Since ferrite material produced in the furnace core tube 3 deposits on the inner wall thereof, the stripping bar 12 is spaced a distance of 3 to 30 mm from the inner wall of the furnace core tube 3 for scraping off the ferrite material deposits from the inner wall.

Using the rotary kiln of the above-mentioned structure, ferrite material can be effectively produced from the mixture of metal chloride and metal oxide defined herein.

The tunnel kiln is a tunnel-shaped kiln for continuously firing or roasting ceramic articles or the like. In the tunnel kiln technique, a carriage having rested thereon articles to be fired is moved at a constant speed through the kiln which is set such that the temperature increases from the inlet to a pre-heating chamber and then to a heating chamber and decreases to a cooling chamber and then to the outlet whereby the articles are fired or roasted at predetermined heating and cooling rates.

Steam is introduced into each of the above-mentioned furnaces desirably by using a non-oxidizing gas forming a part of the atmosphere as a carrier gas. The inert gas used herein may be nitrogen gas, argon gas, etc. as mentioned above.

Reaction takes place instantaneously in the atomizing roaster and fluidized bed roaster techniques. The temperature holding time of the above-mentioned heat treatment is desirably a passage time of up to 2 hours when reaction is effected in the rotary kiln and desirably a passage time of up to 10 hours when reaction is effected in the tunnel kiln. When roasting is effected in the rotary kiln or tunnel kiln, the passage time is desirably set to at least about 10 minutes.

Further, the heating and cooling rates are not critical though they are preferably about 5° to 60° C./min.

The ferrite material prepared by the method of the invention consists essentially of an end phase, that is, a single phase material although inclusion of less than 10% of phases other than the end phase is acceptable. For example, hematite and wustite are typical phases other than magnetite. Since hematite and wustite do not contribute to magnetic properties, their content should be as low as possible.

Desirably the ferrite material prepared by the method of the invention has a specific surface area of 0.8 to 3.0 $m^2/g$.

For example, magnetite is useful as magnetic toner while the recent demand for magnetic toner is toward a smaller particle size. Such desirably fine toner would not be available from magnetite having a specific surface area below the range whereas magnetite having a specific surface area beyond the range would be too small in size and less dispersible.

solid phase reaction were concurrently effected. A gas stream containing nitrogen gas as a carrier gas and steam at an inlet steam pressure of 0.1013 MPa was continuously introduced and passed through the furnace. The furnace was heated at a rate of 3° C./min. to the temperature shown in Table 1, held for the time shown in Table 1, and then cooled down. Note that for a mixture sample containing $ZnCl_2$, the carrier gas was air during initial heating to a temperature of 350° C. and thereafter switched to nitrogen gas.

TABLE 1

| Ferrite type | Material composition (mol %) | Roasting atmosphere | Holding temperature |
|---|---|---|---|
| Fe(magnetite) | $FeCl_2/Fe_2O_3$ = 40/60 | N + S | 500° C./10 min |
| | $FeCl_2/Fe_2O_3$ = 60/40 | N + S | 500° C./10 min |
| | $FeCl_2/Fe_2O_3$ = 60/40 | N + S | 800° C./10 min |
| | $FeCl_2/Fe_2O_3$ = 60/40 | N + S | 450° C./10 min |
| | $FeCl_2/Fe_2O_3$ = 95/5 | N + S | 500° C./10 min |
| | $FeCl_2/Fe_2O_3$ = 60/40 (solution mix) | N + S | 500° C./10 min |
| | $FeCl_2/Fe_2O_3$ = 60/40 (solution mix) | N + S | 700° C./10 min |
| comparison | $FeCl_2$ only | N + S | 450° C./10 min |
| comparison | $FeCl_2$ only | N + S | 800° C./10 min |
| Zn | $ZnCl_2/FeCl_2/FeCl_3/Fe_2O_3$ = 25/45/10/20 (solution mix) | N + S | 350° C./10 min–500° C./10 min |
| | $ZnCl_2/FeCl_2/Fe_2O_3$ = 5/90/5 | A + S→N + S | 350° C./10 min–470° C./10 min |
| | $ZnO/FeCl_2/Fe_2O_3$ = 20/60/20 | A + S→N + S | 300° C./10 min–750° C./10 min |
| comparison | $ZnCl_2/FeCl_2$ = 25/75 (mixed crystal) | A + S→N + S | 350° C./10 min–500° C./10 min |
| Mn—Zn | $MnCl_2/ZnCl_2/FeCl_2/Fe_2O_3$ = 37/10/23/30 | A + S→N + S | 350° C./10 min–500° C./30 min |
| | $MnCl_2/ZnCl_2/FeCl_2/Fe_2O_3$ = 37/10/23/30 (solution mix) | A + S→N + S | 350° C./10 min–700° C./30 min |
| | $MnCl_2/ZnO/FeCl_2/Fe_2O_3$ = 37/10/23/30 | A + S→N + S | 300° C./10 min–500° C./30 min |
| comparison | $MnCl_2/ZnCl_2/FeCl_2$ = 37/10/53 (mixed crystal) | A + S→N + S | 350° C./10 min–500° C./30 min |
| comparison | $MnCl_2/ZnO/Fe_2O_3$ = 37/10/53 | A + S→N + S | 350° C./10 min–600° C./10 min |
| Ni—Cu—Zn | $NiCl_2/CuO/ZnCl_2/FeCl_2/Fe_2O_3$ = 18/12/20/20/30 | A + S→N + S | 350° C./10 min–500° C./10 min |
| comparison | $NiCl_2/CuCl_2/ZnCl_2/FeCl_2$ = 18/12/20/50 (mixed crystal) | A + S→N + S | 350° C./10 min–500° C./10 min |
| Mn—Mg—Zn | $MnCl_2/MgO/ZnCl_2/FeCl_2/Fe_2O_3$ = 1/27/23/20/29 (solution mix) | A + S→N + S | 350° C./10 min–700° C./10 min |
| | $MnCl_2/MgCl_2/ZnCl_2/FeCl_2/Fe_2O_3$ = 1/27/23/20/29 | A + S→N + S | 350° C./10 min–500° C./10 min |
| Ni—Zn | $NiCl_2/ZnCl_2/FeCl_2/Fe_2O_3$ = 20/30/20/30 | A + S→N + S | 350° C./10 min–500° C./10 min |
| Mg—Zn | $MgCl_2/ZnCl_2/FeCl_2/Fe_2O_3$ = 30/20/10/40 | A + S→N + S | 350° C./10 min–500° C./10 min |

N: nitrogen, S: steam, A: air

Where the end product is magnetite, it preferably has a saturation magnetization σs of 82 to 92 emu/g and a coercivity of 60 to 160 Oe in an applied magnetic field of 5,000 Oe.

It is desired that other spinel ferrite materials are characterized by a single phase, high dispersity, and a large specific surface area (typically 0.8 to 3.0 $m^2/g$). The dispersity of ferrite material is represented by a coefficient of variation (CV) value which is desirably as low as possible for each element, typically less than 25.0. The same applies to magnetoplumbite ferrite materials.

EXAMPLE

Examples of the present invention are given below by way of illustration and not by way of limitation.

Example 1
Preparation of Spinel Ferrite Materials

Ferrous chloride tetrahydrate ($FeCl_2.4H_2O$), ferric oxide ($Fe_2O_3$), and another component (metal chloride and/or metal oxide, not necessary when the end product is magnetite) were weighed so as to give the molar ratio shown in Table 1 and mixed in a vibratory mill for 2 hours to produce a mixture sample. Ferric oxide ($Fe_2O_3$) and another component (metal chloride and/or metal oxide, not necessary when the end product is magnetite) were weighed so as to give the molar ratio shown in Table 1, dissolved in water and then mixed with a ferrous chloride ($FeCl_2.4H_2O$) solution to form a mix solution which was agitated at 100° C. while evaporating water, obtaining a mixture sample.

Each of the mixed crystal samples, weighed 100 grams, was placed in a batch furnace where pyrolysis reaction and The resulting samples were examined for crystal type. (1) Magnetite samples were examined for magnetite phase content (wt %), saturation magnetization σs (emu/g), coercivity Hc (Oe), static resistance R (Ω), and specific surface area ($m^2/g$). (2) Samples of ferrite materials other than magnetite were examined by analysis of the end phase, measurement of a coefficient of variation (CV), representative of the dispersity of material, by CMA elemental analysis of material by means of an electron probe micro-analyzer (EPMA), and measurement of specific surface area ($m^2/g$).

The measurements were done as follows.
(1) Magnetite Samples

The type of crystal was identified by qualitative analysis based on powder X-ray diffractometry. The magnetite phase content (wt %) was determined from a relationship of the magnetite phase content to an X-ray relative intensity ratio of respective crystal phases as (emu/g) and Hc (Oe) were measured under an applied magnetic field of 5,000 Oe by means of a vibrating sample magnetometer with 0.1 g of a sample set in the holder. Specific surface area ($m^2/g$) was measured by setting 0.5 g of a sample in a cell according to the BET one point method. Static resistance R (Ω) was determined by setting 0.5 g of a sample in a resistance measuring jig, applying 100 V thereacross, and recording a reading of an insulation resistance tester after 1 minute.
(2) Other Ferrite Material Samples The type of crystal was identified by qualitative analysis based on X-ray diffractometry. Specific surface area ($m^2/g$) was measured according to the BET one point method in the same manner as above. A CV value was measured by weighing 10 g of the ferrite material, filling a mold therewith, and compacting the material under a pressure of 20 MPa/m² into a disk sample. The distribution of grains of respective elements in the disk sample was determined by taking an image of the sample by means of an electron probe micro-analyzer (EPMA) under the following conditions, and counting the number of grains of respective elements per spot size.

EPMA conditions

Accelerating voltage (Vacc): 20 kV

Detection current (Iabs): $10^{-7}$ A

Measurement magnification: 250 μm×160 μm

Beam spot size: 1 μm²

Pixel number: 50,000 points

A coefficient of variation (CV) was determined by dividing the standard deviation by an average of the measurements.

The results are shown in Tables 2 and 3.

surement obtained therefrom is less reliable. In such samples, CV values are also less reliable and thus not reported.

Example 2

Preparation of Magnetoplumbite Ferrite Materials

Ferrous chloride tetrahydrate ($FeCl_2 \cdot 4H_2O$), ferric oxide ($Fe_2O_3$), and a chloride, oxide or carbonate of Ba, Sr, Mg or Co were weighed so as to give the molar ratio shown in Table 4 and mixed in a vibratory mill for 2 hours to produce a mixture sample. Ferric oxide ($Fe_2O_3$) and another component were weighed so as to give the molar ratio shown in Table 4, dissolved in water and then mixed with a ferrous chloride ($FeCl_2 \cdot 4H_2O$) solution to form a mix solution which was agitated at 110° C. while evaporating water, obtaining a granular mixture sample of chloride and oxide having water of crystallization.

TABLE 2

|  | Material composition (mol %) | XRD | Phase (wt %) | σs (emu/g) | Hc (Oe) | Surface area (m²/g) | R (Ω) |
|---|---|---|---|---|---|---|---|
|  | $FeCl_2/Fe_2O_3$ = 40/60 | Spinel | 93.0 | 85.8 | 200 | 2.1 | 4 × 10⁸ |
|  | $FeCl_2/Fe_2O_3$ = 60/40 | Spinel | 96.4 | 88.8 | 150 | 2.1 | 2 × 10⁸ |
|  | $FeCl_2/Fe_2O_3$ = 60/40 | Spinel | 97.1 | 89.8 | 157 | 1.2 | 1 × 10⁸ |
|  | $FeCl_2/Fe_2O_3$ = 60/40 | Spinel | 94.5 | 87.6 | 158 | 2.4 | 9 × 10⁷ |
|  | $FeCl_2/Fe_2O_3$ = 95/5 | Spinel,FeO | 90.5 | 83.6 | 128 | 1.4 | 2 × 10⁷ |
|  | $FeCl_2/Fe_2O_3$ = 60/40 (solution mix) | Spinel | 96.6 | 89.1 | 145 | 1.8 | 2 × 10⁸ |
|  | $FeCl_2/Fe_2O_3$ = 60/40 (solution mix) | Spinel | 95.9 | 88.3 | 138 | 2.2 | 4 × 10⁸ |
| comparison | $FeCl_2$ only | Spinel,FeO,$FeCl_2$ | 48.6 | 44.9 | 257 | UM | 4 × 10⁴ |
| comparison | $FeCl_2$ only | Spinel | 98.5 | 90.7 | 93 | 0.6 | 5 × 10⁵ |

TABLE 3

| Ferrite type | Material composition (mol %) | XRD | Surface area (m²/g) | CV (dispersity of elements) | | | |
|---|---|---|---|---|---|---|---|
| Zn | $ZnCl_2/FeCl_2/FeCl_3/Fe_2O_3$ = 25/45/10/20 (solution mix) | Spinel | 3.0 | Zn: 10.5 | Fe: 3.8 | | |
|  | $ZnCl_2/FeCl_2/Fe_2O_3$ = 25/45/30 | Spinel | 2.8 | Zn: 16.6 | Fe: 6.0 | | |
|  | $ZnO/FeCl_2/Fe_2O_3$ = 20/60/20 | Spinel | 1.1 | Zn: 20.3 | Fe: 11.9 | | |
| comparison | $ZnCl_2/FeCl_2$ = 25/75 (mixed crystal) | Spinel | 0.4 | Zn: 29.0 | Fe: 3.4 | | |
| Mn—Zn | $MnCl_2/ZnCl_2/FeCl_2/Fe_2O_3$ = 37/10/23/30 | Spinel | 1.3 | Mn: 18.3 | Zn: 23.1 | Fe: 6.7 | |
|  | $MnCl_2/ZnCl_2/FeCl_2/Fe_2O_3$ = 37/10/23/30 (solution mix) | Spinel | 1.7 | Mn: 16.9 | Zn: 19.1 | Fe: 5.3 | |
|  | $MnCl_2/ZnO/FeCl_2/Fe_2O_3$ = 37/10/23/30 | Spinel | 1.0 | Mn: 24.9 | Zn: 24.1 | Fe: 9.7 | |
| comparison | $MnCl_2/ZnCl_2/FeCl_2$ = 37/10/53 (mixed crystal) | Spinel,MnO, | UM | | | | |
| comparison | $MnCl_2/ZnO/Fe_2O_3$ = 37/10/53 | Spinel,$Fe_2O_3$ | 1.3 | Mn: 30.5 | Zn: 25.3 | Fe: 13.2 | |
| Ni—Cu—Zn | $NiCl_2/CuO/ZnCl_2/FeCl_2/Fe_2O_3$ = 18/12/20/20/30 | Spinel | 1.3 | Ni: 15.8 | Cu: 20.1 | Zn: 17.8 | Fe: 5.8 |
| comparison | $NiCl_2/CuCl_2/ZnCl_2/FeCl_2$ = 18/12/20/50 (mixed crystal) | Spinel,$NiCl_2$ | UM | | | | |
| Mn—Mg—Zn | $MnCl_2/MgO/ZnCl_2/FeCl_2/Fe_2O_3$ = 1/27/23/20/29 (solution mix) | Spinel | 1.0 | Mn: 11.9 | Mg: 16.0 | Zn: 15.3 | Fe: 5.5 |
|  | $MnCl_2/MgCl_2/ZnCl_2/FeCl_2/Fe_2O_3$ = 1/27/23/20/29 | Spinel | 1.2 | Mn: 15.5 | Mg: 17.3 | Zn: 18.8 | Fe: 4.7 |
| Ni—Zn | $NiCl_2/ZnCl_2/FeCl_2/Fe_2O_3$ = 20/30/20/30 | Spinel | 1.1 | Ni: 15.4 | Zn: 15.8 | Fe: 4.8 | |
| Mg—Zn | $MgCl_2/ZnCl_2/FeCl_2/Fe_2O_3$ = 30/20/10/40 | Spinel | 1.1 | Mg: 18.0 | Zn: 15.0 | Fe: 4.4 | |

It is evident from Tables 1, 2 and 3 that the end phase was effectively produced when a mixture of metal chloride and metal oxide was used according to the present invention. Note that "UM" (unmeasurable) under the heading of specific surface area means that the resulting powder of particles has an extremely varying particle size and the mea- Each of the mixed samples, weighed 100 grams, was placed in a batch furnace where pyrolysis reaction and solid phase reaction were concurrently effected. A gas stream containing nitrogen gas as a carrier gas and steam at an inlet steam pressure of 760 mmHg was continuously introduced and passed through the furnace. The furnace was heated at a rate of 3° C./min. to 500° C., held at the temperature for 10 minutes. Thereafter the atmosphere was switched to nitrogen and the furnace was heated at a rate of 3° C./min. to the temperature shown in Table 4. Thereafter the atmosphere was switched to air and the furnace was held for the time shown in Table 4, and then cooled down, obtaining samples inside and outside the scope of the invention.

The samples were examined for crystal type and other properties as in Example 1. The results are shown in Tables 4 and 5.

TABLE 4

| Ferrite type | Material composition (mol %) | Roasting atmosphere | Holding temperature |
|---|---|---|---|
| Ba (M Type) | $BaCl_2/FeCl_2/Fe_2O_3 = 14/60/26$ | N + S →N→A | 500° C./10 min–900° C.–900° C./120 min |
| comparison | $BaCl_2/FeCl_2 = 14/86$ (mixed crystal) | N + S →N→A | 500° C./10 min–900° C.–900° C./120 min |
| Sr (M Type) | $SrCl_2/FeCl_2/Fe_2O_3 = 14/60/26$ | N + S →N→A | 500° C./10 min–900° C.–900° C./120 min |
| | $SrCl_2/FeCl_2/FeCl_3/Fe_2O_3 = 14/50/10/26$ | N + S →N→A | 500° C./10 min–900° C.–900° C./120 min |
| | $SrCl_2/FeCl_2 = 14/86$ (mixed crystal) | N + S →N→A | 500° C./10 min–900° C.–900° C./120 min |
| $Co_2Y$ (Y Type) | $CoCl_2/BaCl_2/FeCl_2/Fe_2O_3 = 7/14/55/29$ (solution mix) | N + S →N→A | 500° C./10 min–1100° C.–1100° C./180 min |
| | $CoCl_2/BaCl_2/FeCl_2 = 7/14/79$ (mixed crystal) | N + S →N→A | 500° C./10 min–1100° C.–1100° C./180 min |
| $Mg_2Y$ (Y Type) | $MgO/BaCl_2/FeCl_2/Fe_2O_3 = 7/14/55/29$ (solution mix) | N + S →N→A | 500° C./10 min–1200° C.–1200° C./120 min |
| $Co_2Z$ (Z Type) | $CoCl_2/BaCl_2/FeCl_2/Fe_2O_3 = 12/18/40/30$ | N + S →N→A | 500° C./10 min–1300° C.–1300° C./180 min |

N: nitrogen, S: steam, A: air

TABLE 5

| Ferrite type | Material composition (mol %) | XRD | Surface area (m²/g) | CV (dispersity of elements) | | |
|---|---|---|---|---|---|---|
| Ba (M type) | $BaCl_2/FeCl_2/Fe_2O_3 = 14/60/26$ | $BaFe_{12}O_{19}$ | 1.1 | Ba: 14.9 | Fe: 5.6 | |
| comparison | $BaCl_2/FeCl_2 = 14/86$ (mixed crystal) | $BaFe_{12}O_{19},Fe_2O_3$ | 1.2 | Ba: 38.8 | Fe: 5.4 | |
| Sr (M type) | $SrCl_2/FeCl_2/Fe_2O_3 = 14/60/26$ | $SrFe_{12}O_{19}$ | 1.3 | Sr: 13.8 | Fe: 5.2 | |
| | $SrCl_2/FeCl_2/FeCl_3/Fe_2O_3 = 14/50/10/26$ | $SrFe_{12}O_{19}$ | 1.1 | Sr: 15.9 | Fe: 4.5 | |
| comparison | $SrCl_2/FeCl_2 = 14/86$ (mixed crystal) | $SrFe_{12}O_{19},Fe_2O_3$ | 1.3 | Sr: 41.0 | Fe: 3.6 | |
| $Co_2Y$ (Y type) | $CoCl_2/BaCl_2/FeCl_2/Fe_2O_3 = 7/14/55/29$ (solution mix) | $Ba_2Co_2Fe_{12}O_{22}$ | 0.9 | Ba: 15.5 | Co: 17.6 | Fe: 5.5 |
| comparison | $CoCl_2/BaCl_2/FeCl_2 = 7/14/79$ (mixed crystal) | $Ba_2Co_2Fe_{12}O_{22}$, $BaFe_{12}O_{19},CoFe_2O_4$ | 1.0 | Ba: 20.5 | Co: 24.9 | Fe: 4.5 |
| $Mg_2Y$ (Y type) | $MgO/BaCl_2/FeCl_2/Fe_2O_3 = 7/14/55/29$ (solution mix) | $Ba_2Mg_2Fe_{12}O_{22}$ | 1.0 | Ba: 18.7 | Mg: 20.9 | Fe: 4.3 |
| $Co_2Z$ (Z type) | $CoCl_2/BaCl_2/FeCl_2/Fe_2O_3 = 12/18/40/30$ | $Ba_3Co_2Fe_{24}O_{41}$ | 0.8 | Ba: 14.5 | Co: 15.6 | Fe: 5.1 |

It is evident that magnetoplumbite ferrite materials having the end phase and good dispersity are obtained according to the present invention.

Japanese Patent Application No. 180746/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a ferrite material comprising the steps of:
   mixing iron chloride, another optional metal chloride, iron oxide, and another optional metal oxide to form a mixture as a starting raw material, and
   roasting the raw material, at least a part of the roasting step being carried out in a steam-containing atmosphere so that the raw material may undergo pyrolysis reaction and solid phase reaction at the same time.

2. The method of claim 1 wherein said mixture contains the iron chloride and metal chloride and the iron oxide and metal oxide in a molar ratio between 99/1 and 30/70.

3. The method of claim 1 wherein said mixture contains 40 to 95 mol % of iron chloride ($FeCl_2$) and iron oxide ($Fe_2O_3$) combined.

4. The method of claim 3 wherein the molar ratio of $FeCl_2$ to $Fe_2O_3$ ranges from 0.6 to 18.

5. The method of claim 1 wherein
   the other metal chloride is selected from chlorides of divalent metals: Ni, Cu, Co, Zn, Mg and Mn and a chloride of trivalent Fe, and
   the other metal oxide is selected from oxides of divalent metals: Ni, Cu, Co, Zn, Mg and Mn and an oxide of trivalent Mn,
   whereby a spinel ferrite material is prepared.

6. A method for preparing a ferrite material comprising the steps of:
   mixing at least one metal chloride selected from chlorides of divalent metals: Ba, Sr, Fe, Ni, Co, Mg and Zn and a chloride of trivalent Fe and at least one metal oxide selected from oxides of divalent metals: Pb, Ni, Mg, Co and Zn and an oxide of trivalent Fe to form a mixture as a starting raw material, wherein said raw material contains at least one member selected from the group consisting of Ba, Sr and Pb,
   roasting the raw material in an atmosphere consisting of a non-oxidizing gas and steam so that the raw material may undergo pyrolysis reaction and solid phase reaction at the same time, thereby forming a spinel ferrite material and an intermediate product,
   continuing roasting in a non-oxidizing atmosphere, and continuing roasting in an oxidizing atmosphere to thereby effect solid phase reaction, thereby producing a magnetoplumbite ferrite material.

7. A method for preparing a ferrite material, comprising:
   roasting a raw material in a gas comprising steam, thereby producing an intermediate and HCl;
   wherein said raw material comprises iron chloride and iron oxide.

8. The method of claim 7, further comprising:
   roasting said intermediate in a non-oxidizing gas.

9. The method of claim 8, further comprising roasting said intermediate in anoxidizing gas, thereby producing a ferrite.

10. The method of claim 7, wherein said roasting in said gas comprising steam is carried out at 430°–800° C.

11. The method of claim 7, wherein said raw material further comprises at least one member selected from the group consisting of another metal chloride, another metal oxide, and a metal carbonate.

12. The method of claim 7, wherein said raw material further comprises zinc chloride or zinc oxide, and said gas further comprises oxygen.

13. The method of claim 9, wherein said oxidizing gas comprises more than 15 percent by volume of oxygen.

14. The method of claim 7, wherein said raw material comprises the iron chloride and metal chloride, to the iron oxide and metal oxide, in a molar ratio between 99/1 and 30/70.

15. The method of claim 7, wherein said raw material comprises 40 to 90 mol % of iron chloride and iron oxide combined.

16. The method of claim 15, wherein a molar ratio $FeCl_2$ to $Fe_2O_3$ ranges from 0.6 to 18.

17. The method of claim 9, wherein said raw material further comprises at least an oxide or chloride of a metal selected from the group consisting of Ba, Sr and Pb, and said ferrite comprises a magnetoplumbite.

* * * * *